United States Patent
Leschinger et al.

(10) Patent No.: US 6,198,041 B1
(45) Date of Patent: Mar. 6, 2001

(54) PEDESTAL CLOSURE ASSEMBLY

(76) Inventors: Matthew Leschinger, 1340 S. Main St., Wheaton, IL (US) 60187; Lawrence Santo Dolan, 929 Moccasin Ct., Carol Stream, IL (US) 60188; Thomas Potosnak, 48 McKinley La., Streamwood, IL (US) 60107

(*) Notice: Subject to any disclaimer, the term of this patent is extended or adjusted under 35 U.S.C. 154(b) by 0 days.

(21) Appl. No.: 09/366,982

(22) Filed: Aug. 4, 1999

(51) Int. Cl.[7] ........................................ H02G 9/00
(52) U.S. Cl. ............................. 174/38; 174/39; 52/3
(58) Field of Search ........................ 174/37, 38, 17 R, 174/17 CT, 58, 59, 60, 39; 220/3.3; 361/364; 52/3

(56) References Cited

U.S. PATENT DOCUMENTS

| | | | |
|---|---|---|---|
| 3,164,668 | * 1/1965 | Skubal | 174/45 R |
| 3,435,124 | 3/1969 | Channell . | |
| 3,480,721 | * 11/1969 | Baumgartner | 174/38 |
| 3,652,779 | * 3/1972 | Grinols | 174/38 |
| 3,812,279 | 5/1974 | Voegeli . | |
| 3,872,234 | 3/1975 | Smith . | |
| 4,631,353 | * 12/1986 | Marks | 174/38 X |
| 4,751,610 | * 6/1988 | Nickola | 361/664 |
| 4,864,467 | * 9/1989 | Byrd et al. | 174/38 X |
| 5,117,067 | 5/1992 | Jaycox . | |
| 5,210,374 | 5/1993 | Channell . | |
| 5,384,427 | * 1/1995 | Volk et al. | 174/37 X |

OTHER PUBLICATIONS

Information regarding Sealed Plant Telephone Enclosures from Channell Commercial Corporation's Website (www.channellcomm.com) (2 pages). No Date.

* cited by examiner

Primary Examiner—Kristine Kincaid
Assistant Examiner—Dhiru R Patel
(74) Attorney, Agent, or Firm—Jones, Day, Reavis & Pogue

(57) ABSTRACT

A pedestal closure assembly having a housing that defines an enclosed interior space and includes two side walls, a front wall, a rear wall, an upper portion and a lower portion. A mounting plate is supported by the housing in the interior space and serves to support electronic interconnection blocks. A grounding element to enable grounding of electrical equipment connected to any electronic interconnection block is also attached to the mounting plate. The lower portion of the housing has a scoop-shaped structure and a step structure to allow substantially vertically aligned installation and enhanced anchoring in a support medium such as earth, concrete and the like. The step portion may be formed on either the front wall or rear wall of the lower portion of the housing. The housing, mounting plate scoop-shaped structure and step structure is constructed of non-metallic material, such as high density polyethylene, or HDPE.

13 Claims, 5 Drawing Sheets

PEDESTAL CLOSURE ASSEMBLY

BACKGROUND OF THE INVENTION

1. Field of the Invention

The present invention relates to pedestal closure assemblies for storing power and telecommunications equipment, and more particularly to pedestal closure assemblies configured to promote ease of installation and enhanced anchoring in a support medium in a substantially vertical alignment.

2. Description of Related Art

Telecommunications, cable television, power distribution equipment and the like, including primary cable loops, terminal blocks, and connections between the primary cable loop and the terminal blocks are commonly located out-of-plant or outdoors. Since the necessary equipment is located outside, a protective covering is required to protect the equipment from human interference as well as from the environment. Therefore, such protective coveting must provide structural as well as environmental protection.

Typically, the protective covering is produced in the form of a pedestal. The pedestal structure includes a housing with a sufficient volume in a minimum area and in a convenient working orientation for containing the aforementioned equipment. Inside the housing, cable pairs may be interconnected to each other. Such interconnections are made at a connector block which is mounted to a universal mounting plate inside the closure. The connector block includes a number of terminals and the pairs of wires in the cable are stripped of their insulation and connected to the terminals.

A base portion, or lower end, of the closure housing is recessed and secured in the ground, and has a passageway to permit a cable to extend therethrough. The cable is covered by a top portion, or upper end, of the housing which attaches to the base portion. The pedestal, when assembled and installed, should have sufficient structural strength to resist minor impacts as well as other environmental conditions such as wind, snow accumulation or precipitation impact.

Heretofore, these pedestal closure assemblies typically have been installed in the ground by digging a hole large enough to fit the entire square-shaped base portion, or lower end. The large lower end is then placed into the hole, the ground is back-filled into the hole, and a stake is inserted into the ground and attached to the lower end thereby further securing the lower end in the ground. However, square-shaped base portion prior art pedestals that use ground stakes to maintain vertical alignment are not secure in the ground. They tip over in inclement weather and when jostled, for example, by heavy machinery that is used around the pedestals.

Once the ground stake has been added and the pedestal is stabilized in the ground, the universal mounting plate is then installed in the housing, and the top portion, or upper end, is finally locked onto the lower end.

A commercially available non-metallic sealed plant telephone enclosure sold by Channel Commercial Corporation and apparently disclosed by U.S. Pat. No. 5,210,374 has a generally scoop-shaped lower end, but does not have a step portion formed on the housing for stabilization. As described above, a ground stake needs to be used to further stabilize the telephone enclosure in the ground, and even then, the pedestal tends to tip and be misaligned because of the inherent problems associated with separate ground stakes. Other commercially available pedestals which require a stake for further ground stabilization include Reltec Corp.'s PEDSEAL® Sealed Pedestals.

U.S. Pat. No. 3,435,124 discloses a pedestal with a plastic, generally scoop-shaped "stake," or lower end. The patent teaches that a separate ground stake still needs to be used to further stabilize the pedestal in the ground. Again, one can anticipate similar problems with tipping and misaliginent as are described above with the square-shaped base section prior art pedestals that require separate ground stakes for further stabilization in the ground.

U.S. Pat. No. 3,812,279 discloses a cable television housing with a "tubular base member," or lower end. Again, a separate ground stake is apparently required to further stabilize the housing in the ground.

U.S. Pat. No. 3,872,234 discloses a pedestal enclosure without a traditional square-shaped housing lower end. Instead, it discloses a ground stake means for stabilizing the housing in the ground that can be attached to the housing by using screws or bolts. However, the attached ground stake means does not eliminate the tipping and misalignment problems described above.

U.S. Pat. No. 5,117,067 discloses an environmentally sealed pedestal with a square-shaped lower end. As with the other prior art assemblies disclosed above, a ground stake is needed to keep this pedestal from tipping or becoming dislodged while in the ground. As described above, however, the ground stake does not usually prevent this from happening.

U.S. Pat. No. 5,384,427 discloses a flood protection pedestal with a square-shaped lower end in need of a separate ground stake for stabilization when installed in the ground.

Presently, other commercially available pedestal closure assemblies are constructed of metal and most have generally square-shaped lower ends which need a ground stake to ensure stable installation into the ground. This construction presents various problems. For example, the pedestals are difficult to install and have a tendency to be misaligned when installed as well as lean or tilt in the ground after they have absorbed physical impact and environmental attack over a period of time. Furthermore, a large hole needs to be dug in order to fit the entire lower end of these prior art pedestals into the ground. Also, complete installation of such pedestals requires a stabilizing ground stake to be inserted into the ground to prevent the pedestal closure assembly from tipping after installation in the support medium. As with all of the prior art pedestal closures that need separate ground stakes for increased stabilization in the ground, in practice, these stakes are often installed incorrectly (at the wrong angle) or in the wrong place causing many of the presently installed pedestal closure assemblies to tip or tilt anyway shortly after installation in a support medium such as earth, cement and the like.

Additionally, the costs involved with fabricating metal pedestal closure assemblies are generally higher than for non-metallic ones. Furthermore, since metal pedestal closure assemblies are relatively heavy, it takes costly and time-consuming labor to install them correctly and to ensure that they do not begin to lean after installation and extended physical and environmental impact in a support medium.

BRIEF SUMMARY OF THE INVENTION

A general object of the present invention is to provide pedestal closure assemblies for storing telecommunications, cable television, power distribution equipment and the like that are lighter and require less labor for installation.

A more specific object of the present invention is to provide pedestal closure assemblies structured and dimensioned for less costly, expedited insertion into a support medium, such as earth, concrete and the like.

Yet another aspect of the present invention is to provide pedestal closure assemblies that stay upright in substantially vertical alignment in a support medium after installation and subsequent exposure to physical and environmental impact.

A further aim of the present invention is to eliminate the need for using supplemental stabilizing tools or devices, such as stakes, to help keep the pedestal closure assemblies from leaning or tipping at the time of or after installation.

In accordance with the present invention, as embodied and broadly described herein, these objects, aims and aspects are achieved by providing a pedestal closure assembly including a generally elongate housing preferably formed from a non-metallic material such as high density polyethylene, or HDPE. The housing has an upper portion and a lower portion defining an interior space, and also includes two side walls, a front wall and a rear wall. The housing further includes a mounting plate, preferably, a non-metallic universal mounting plate, supported by at least one wall and structured and dimensioned for receiving at least one electronic interconnection block housed within the interior space, and a grounding element. The grounding element allows the grounding of electrical equipment connected to the electronic interconnection blocks attached to the mounting plate.

In a preferred embodiment of this invention, the lower portion of the pedestal housing has a scoop-shaped structure with a step structure formed on the rear wall so as to allow the pedestal closure assembly to be installed and better anchored in a support medium such as earth, concrete or the like in a substantially vertical alignment. This step structure is dimensioned to maintain the substantially vertical alignment of the pedestal after installation. The integral step structure eliminates the need for a separate stabilizing ground stake as is required by the prior art pedestals disclosed above.

Among the advantages of the pedestal closure assemblies constructed in accordance with the present invention are the reduced labor required to install the pedestal closure assembly, since the hole that needs to be made to insert the lower end or base of the pedestal can be smaller and less deep than for the prior art square-shaped pedestals. Another advantage of the pedestal closure assemblies of this invention is that because of the combination of the scoop-shaped structure and the step structure on the lower end of the housing, the pedestal closure assembly of the present invention requires no additional stakes or similar supplemental tools or devices to keep the assembly from tipping or leaning upon installation or thereafter. In addition, non-metallic pedestal closure assemblies are less expensive to manufacture, are lighter and require less labor to install and maintain than metal assemblies.

Additional novel features and advantages of the present invention will be set forth in part in the description that follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE DRAWINGS

The organization and manner of operation of the invention, together with further objects and advantages thereof, may best be understood by reference to the following description taken in connection with the accompanying drawings in which like reference numerals identify like elements, and in which:

FIG. 3(a) is a partial rear perspective view of the assembly of FIGS. 1–3.

DETAILED DESCRIPTION OF THE INVENTION

Figure 1:
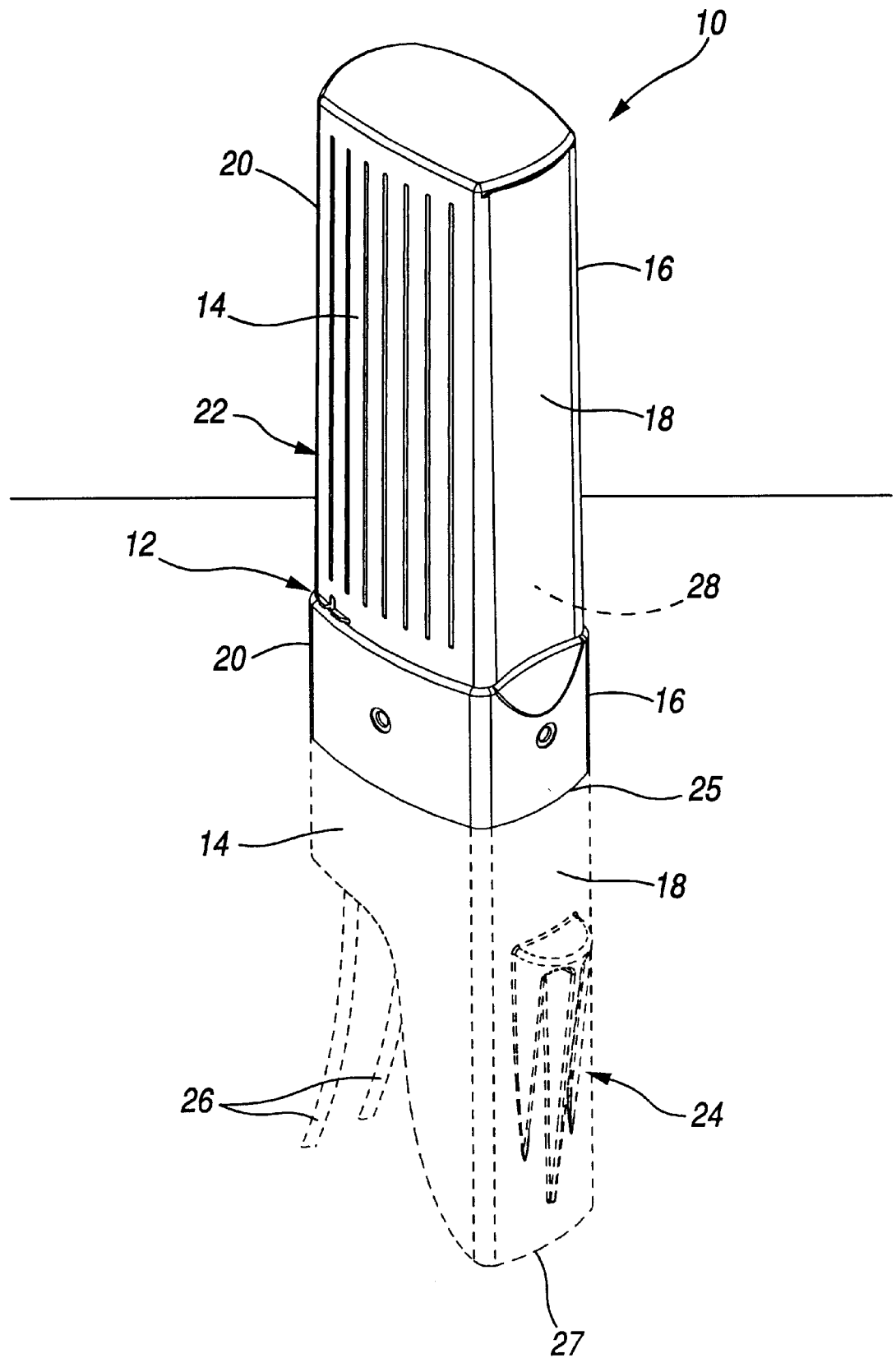
FIG. 1 is a perspective view of a pedestal closure assembly of the present invention installed in a support medium.

Referring now to the drawings, a pedestal closure assembly is designated generally by reference numeral 10 and includes a generally elongate housing 12 defining an enclosed interior space 28 with a side wall 14, a side wall 16, a rear wall 18, and a front wall 20. The pedestal closure assembly is divided into an upper portion 22 and a lower portion 24. The upper and lower portions removably engage with one another to allow easy access to the interior space. As illustrated in FIG. 1, the pedestal closure assembly 10 is installed with the lower portion 24 of the housing 12 recessed into a pit, trench or hole in the support medium 25, such as earth, concrete or the like. This hole can be smaller than for prior art square pedestals because the lower portion 24 is smaller and easier to insert into the support medium 25 given its scoop-shaped structure. For illustrative purposes, a buried multi-pair primary cable 26 is shown extending upwardly from below the pedestal closure assembly 10 through the lower portion 24 into the interior space 28 of the housing 12.

Figure 2:
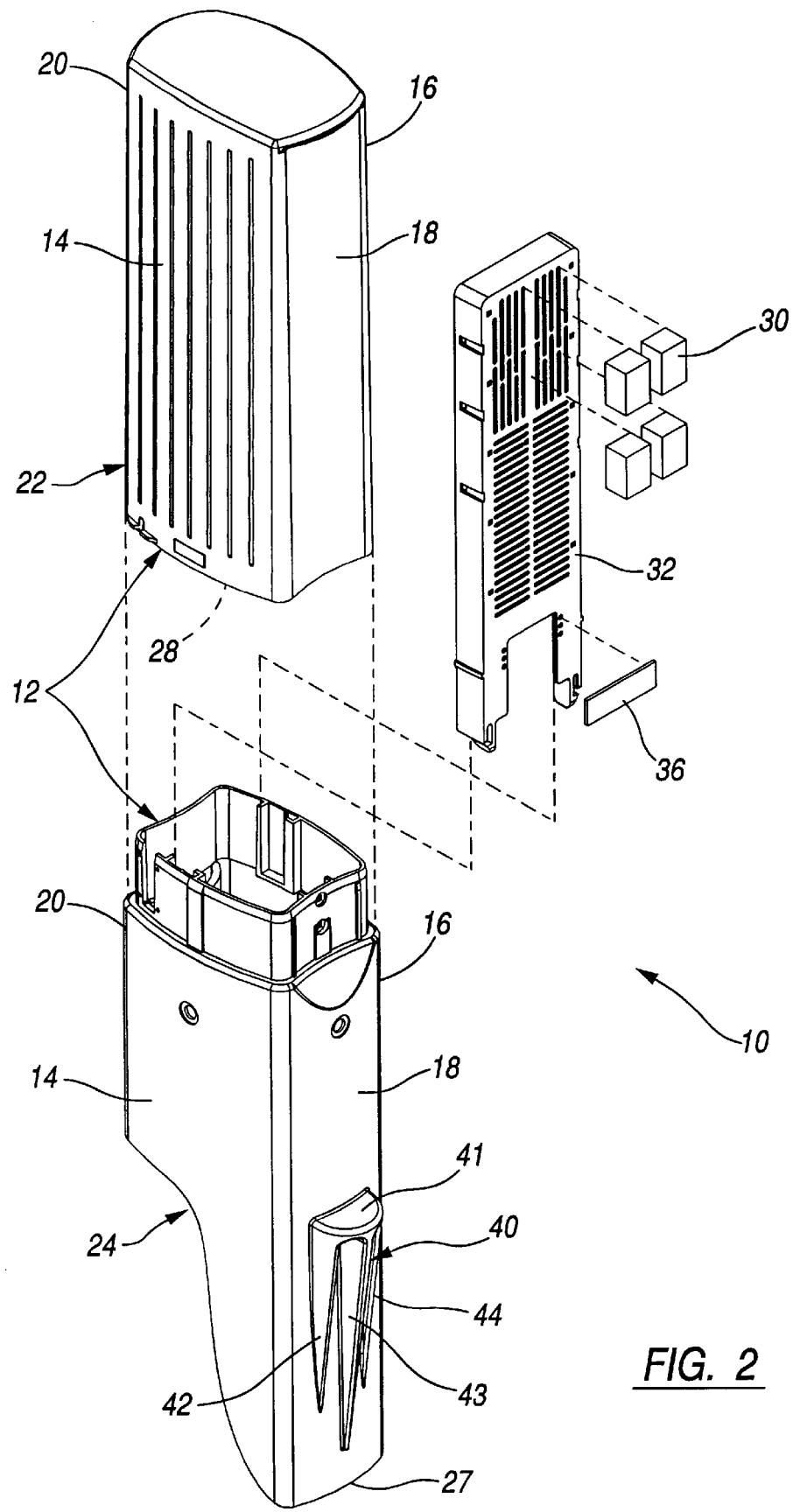
FIG. 2 is an exploded perspective view of the pedestal closure assembly as illustrated in FIG. 1.

The simplicity of the pedestal closure assembly 10 is best depicted in FIG. 2, where electronic interconnection blocks, such as several terminal blocks 30, as well as other telecommunications, cable television, power distribution equipment and the like, may be retained within the enclosed interior space 28 defined by the housing 12 of the pedestal closure assembly 10. Also contained within the interior space 28 is a universal mounting plate 32 upon which the terminal blocks 30 and the like are mounted. Also affixed to the mounting plate 32 is a conductive metal grounding bracket 36 which enables the electrical equipment connected to the terminal blocks 30 to be electrically grounded.

The lower portion 24 of the housing 12 of the pedestal closure assembly 10 as illustrated herein is shown to have a scoop-shaped structure in combination with a step structure 40 to allow substantially vertically aligned installation and enhanced anchoring of the pedestal closure assembly in earth, cement or other support medium 25. However, it is to be noted that other configurations suitable for enabling expedited installation of the assembly into a support medium such as soil, earth, clay, cement and the like may be employed to shape or form the lower portion 24 of the housing 12. Nonetheless, the lower portion is formed in a manner such that substantially vertically aligned installation, as well as enhanced anchoring of the assembly in the support medium, is enabled as a result of the structure and dimension of this lower portion.

Figure 3:
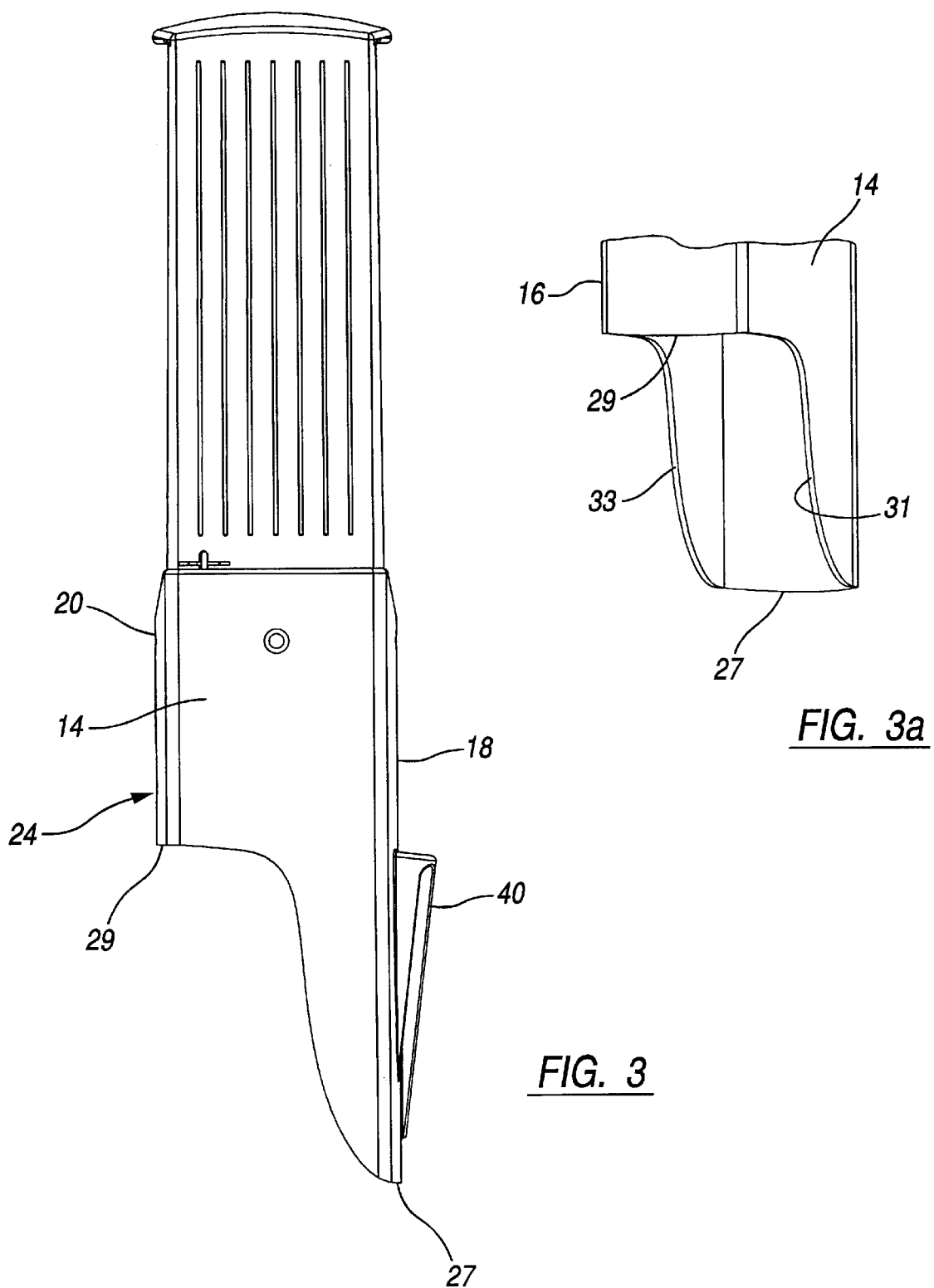
FIG. 3 is a side elevation view illustrating the preferred embodiment of the present invention wherein the lower end of the pedestal closure assembly is provided with a step portion formed on the rear wall thereof.

As illustrated in FIG. 3, the scoop shape structure of the lower portion is formed by an elongation of the front wall 18 to a lower edge 27 and a smooth tapering of corresponding sections of the side wall 14 and the side wall 16 to a lower edge 29 of the less elongated rear wall 20. The smooth tapering produces an edge 31 for the wall 14 and an edge 33 for the wall 16, FIG. 3a.

In a preferred embodiment of the present invention, the housing 12 and the universal mounting plate 32 are constructed from non-metallic material such as high density polyethylene, or HDPE, by an injection molding process. This minimizes manufacturing costs without sacrificing structural rigidity of the pedestal closure assembly 10, and with the structure disclosed, allows for installation with less labor.

Figure 4:
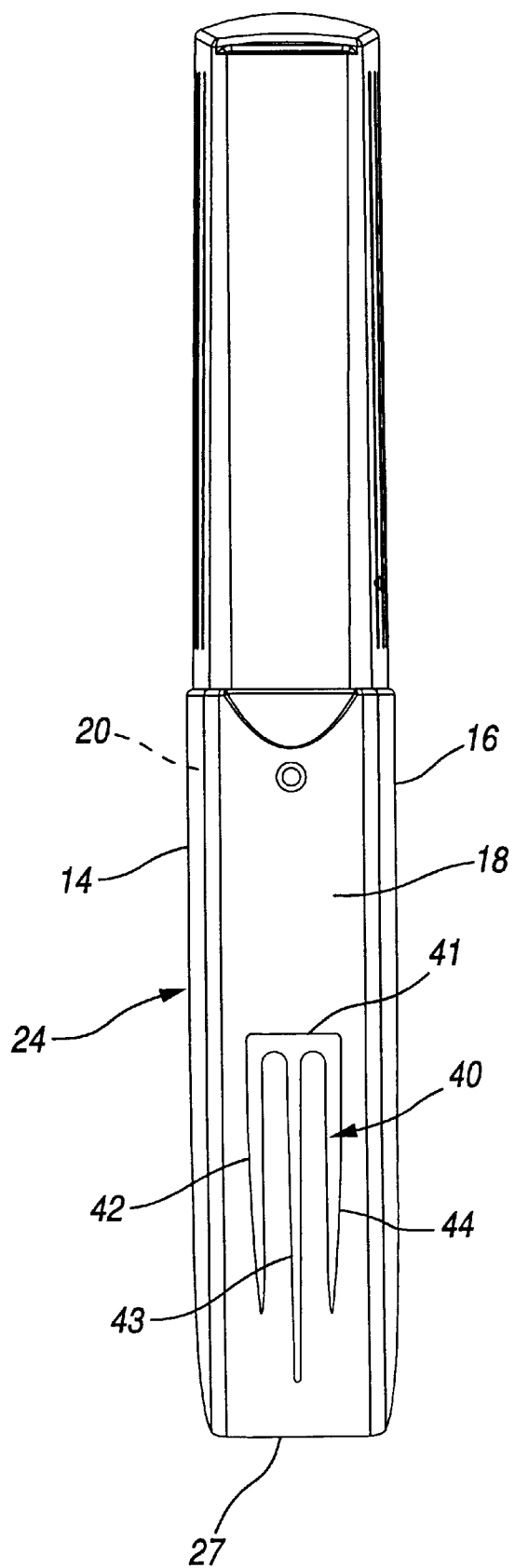
FIG. 4 is a back elevation view illustrating the step portion.

FIG. 4 shows the step structure 40 positioned on the rear wall 18 of the lower portion. This step structure 40 has a horizontal ledge 41 with a first short leg 42, a long second leg 43, and a third short leg 44 descending therefrom. All three tapered, vertically disposed legs are evenly spaced apart. The first and third legs are also narrower than the second leg thereby increasing the surface area in contact with the support medium.

Figure 5:
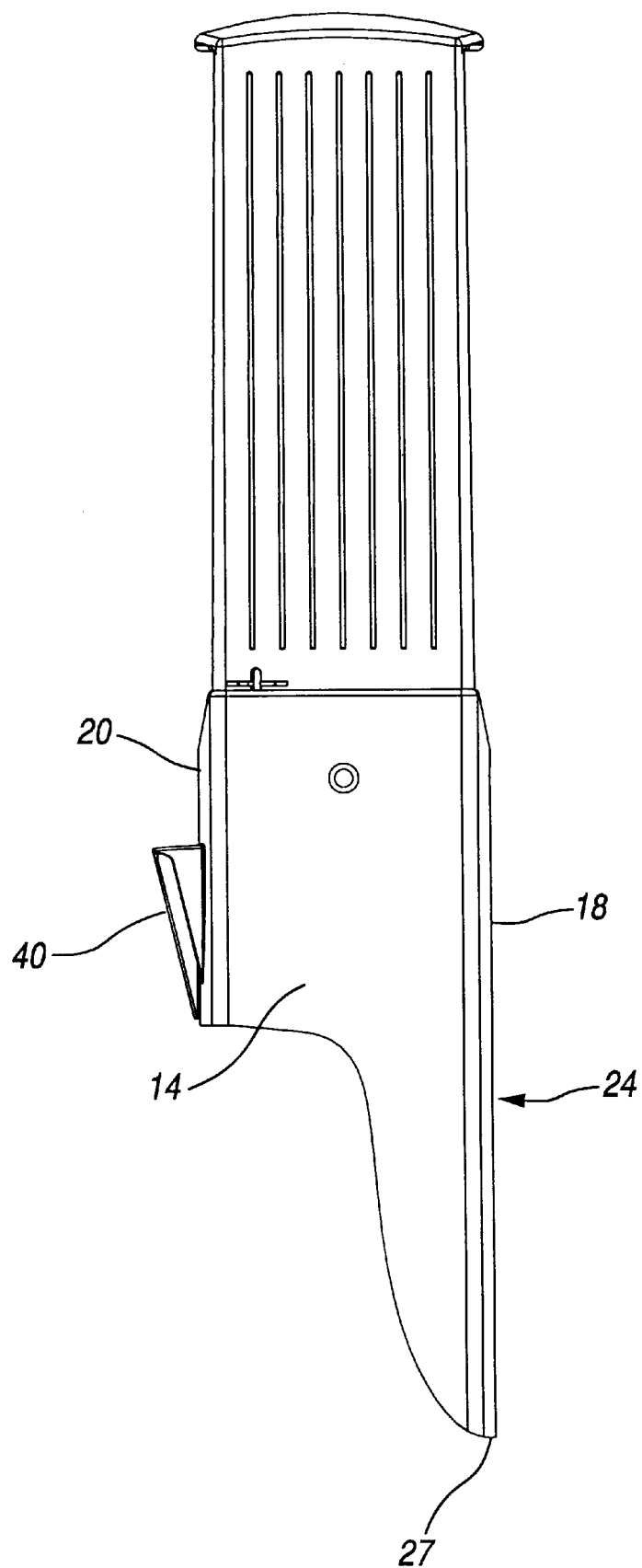
FIG. 5 is a side elevation view illustrating a further embodiment of the present invention wherein the lower end of the pedestal closure assembly is provided with a step portion on the front wall thereof.

This step structure 40 is designed and dimensioned to enhance the anchoring of the assembly 10 in substantially vertical alignment when installed in earth, concrete or other support medium. In a preferred embodiment, step structure is positioned on the scoop-shaped structure of the front wall. Alternatively, step structure 40 can be positioned on the rear wall 20 as shown in FIG. 5.

In tandem with the scoop-shaped structure of the lower portion, the step structure 40 keeps the pedestal closure assembly secure in its support medium, even in times of high wind, heavy snow or high physical impact, such as when the pedestal closure assembly is hit with a car or lawnmower, a not uncommon occurrence. This occurs when the scoop-shaped structure is inserted deeper into the ground than the square-shaped lower end of prior art pedestals. The deeper insertion is achieved because of its relatively narrow width. In addition, the surface area of the lower portion against which the support medium presses is increased by the long, yet wide scoop-shaped structure and unique configuration of the step structure 40, including the horizontally extending or projecting ledge 41 and the vertically extending legs 42, 43 and 44. See FIGS. 2 and 3 where the legs extend from the ledge and downwardly along the lower portion of the housing. This configuration stabilizes and anchors the pedestal closure assembly in the support medium. In addition, because the step structure is an integral part of the scoop-shaped lower portion, the full benefit of the increased surface area can be realized without any compromise that may be introduced by a separate ground stake that is inserted after initial installation of the assembly. The prior art square-shaped pedestal and separate ground stake, on the other hand, do not increase the surface area of its lower portion enough to improve the stabilization of the pedestal after it is installed.

One of the advantages of the present invention is that the labor required to install the scoop-based pedestal closure assembly is minimized since the hole that needs to be made to insert the lower portion is smaller, and the step structure can be stepped on during installation for easier insertion into dense support media such as clay, cement or dry earth. Another advantage is that the hole for the assembly need not be dug too deeply because the scoop-shaped structure may be driven into the support medium with the help of the step structure. In addition, as a result of the scoop-shaped structure in combination with the step portion formed in the lower portion, no additional stakes or similar supplemental tools or devices are needed to keep the pedestal closure from tipping or leaning after installation in the support medium. Both of these advantages are a direct result of the scoop-shaped structure of the lower portion of the pedestal closure in combination with the step structure formed in the lower portion. A further advantage of the preferred embodiment is that the non-metallic pedestal closure assembly is less expensive to manufacture and easier to install and keep substantially vertically aligned than the prior art metal pedestal closure assemblies.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. For example, a square, triangular, or any other geometric-shaped step structure with a different number of vertically descending legs would be equivalent. The assembly itself may have a triangular, circular or square cross section. As such, the scope of the invention should not be limited by the particular embodiments and specific constructions described herein but should be defined by the appended claims and equivalents thereof. Accordingly, the aim in the appended claims is to cover all such changes and modifications as fall within the true spirit and scope of the invention.

What is claimed is:

1. A pedestal closure assembly comprising:
   a generally elongated pedestal housing having walls defining an enclosed interior space, said housing also having an upper portion and a lower portion;
   said lower portion of said housing being structured and dimensioned to include a scoop-shaped structure in combination with a step structure positioned on said scoop-shaped structure, said structures being dimensioned for maintaining a substantially vertical alignment of said housing in a support medium.

2. The pedestal closure assembly of claim 1 including a mounting plate positioned within said interior space and supported therein and wherein said housing and said mounting plate are constructed of non-metallic material.

3. The pedestal closure assembly of claim 1 wherein said walls include a front wall and a rear wall of said lower portion of said housing and said step portion is positioned on said rear wall of said lower portion of said housing.

4. The pedestal closure assembly of claim 1 wherein said walls include a front wall and a rear wall of said lower portion of said housing and said step portion is positioned on said front wall of said lower portion of said housing.

5. The pedestal closure assembly as claimed in claim 1 wherein said step structure projects from said lower portion of said housing and includes a ledge and vertically extending legs.

6. The pedestal closure assembly of claim 5 wherein said legs include two short outside legs and a long middle leg.

7. The pedestal closure assembly of claim 6 wherein said legs are tapered.

8. The pedestal closure assembly of claim 7 wherein said ledge and said vertically extending legs increase surface area available for contact between said assembly and the support medium.

9. The pedestal closure assembly of claim 1 wherein said walls include two side walls, a front wall and a rear wall;

said scoop-shaped structure includes oppositely disposed, smoothly tapered compound edges along said side walls; and wherein said front wall is longer than said rear wall.

10. The pedestal closure assembly of claim 9 wherein said step structure projects from said front wall; and includes a plurality of tapered legs extending along said lower portion of said housing.

11. The pedestal closure assembly of claim 10 wherein said plurality of legs are integrally connected to said lower portion of said housing.

12. A pedestal closure assembly comprising:

a generally elongated pedestal housing having two side walls, a front wall and a rear wall, said housing defining an enclosed interior space and having an upper portion and a lower portion;

said lower portion of said housing being structured and dimensioned for enabling substantially vertically aligned installation and enhanced anchoring of the assembly in a support medium, the lower portion including a step structure for maintaining the substantially vertical alignment in the support medium, said step structure being formed on said lower portion of said housing.

13. The pedestal closure of claim 12 wherein said step structure integral with said housing.

* * * * *